United States Patent
Colussi et al.

(10) Patent No.: US 8,490,014 B2
(45) Date of Patent: Jul. 16, 2013

(54) METHOD AND SYSTEM FOR CONTROLLING THE ARRANGEMENTS OF WINDOWS ON A DISPLAY

(75) Inventors: Agostino Colussi, Rome (IT); Andrea Tortosa, Rome (IT)

(73) Assignee: International Business Machines Corporation, Armonk, NY (US)

( * ) Notice: Subject to any disclaimer, the term of this patent is extended or adjusted under 35 U.S.C. 154(b) by 379 days.

(21) Appl. No.: 12/235,258

(22) Filed: Sep. 22, 2008

(65) Prior Publication Data

US 2009/0119617 A1    May 7, 2009

(30) Foreign Application Priority Data

Nov. 7, 2007 (EP) .................................. 07120128

(51) Int. Cl.
 *G06F 3/048* (2006.01)
(52) U.S. Cl.
 USPC ........................ 715/808; 715/781; 715/790
(58) Field of Classification Search
 USPC .................. 715/808, 794, 764–790
 See application file for complete search history.

(56) References Cited

U.S. PATENT DOCUMENTS

| 6,031,530 | A  * | 2/2000 | Trueblood ................... 715/791 |
| 7,676,761 | B2 * | 3/2010 | Oliver et al. ................. 715/803 |
| 2002/0171683 | A1 * | 11/2002 | Meaden ....................... 345/794 |
| 2003/0011639 | A1 * | 1/2003 | Webb ............................ 345/808 |
| 2003/0112278 | A1 * | 6/2003 | Driskell ....................... 345/788 |
| 2006/0070008 | A1 * | 3/2006 | Sauve et al. .................. 715/788 |
| 2006/0107229 | A1 | 5/2006 | Matthews et al. |
| 2006/0161623 | A1 | 7/2006 | Montgomery et al. |
| 2006/0230156 | A1 * | 10/2006 | Shappir et al. ............... 709/227 |
| 2007/0022389 | A1 * | 1/2007 | Ording et al. ................ 715/790 |
| 2007/0192734 | A1 * | 8/2007 | Berstis et al. ................ 715/808 |
| 2008/0115081 | A1 * | 5/2008 | Sankaravadivelu et al. .. 715/783 |

* cited by examiner

*Primary Examiner* — Matt Kim
*Assistant Examiner* — Tuan S Nguyen
(74) *Attorney, Agent, or Firm* — Steven L. Bennett

(57) ABSTRACT

One aspect of the present invention includes management of the presentation of information on a display. In one embodiment, this includes defining a delimited area on the display for a predetermined activity, and identifying a new application, which when active, comprises an active location on the display that covers some or all of the delimited area. When the new application covers some or all of the delimited area, the active location of the new application is automatically changed so that the new application will not cover any of the delimited area. Accordingly, the delimited area of the display can be preserved for uninterrupted use by a user.

6 Claims, 4 Drawing Sheets

METHOD AND SYSTEM FOR CONTROLLING THE ARRANGEMENTS OF WINDOWS ON A DISPLAY

FIELD OF THE INVENTION

The present invention relates to a method and system for controlling the arrangement of windows on a display, particularly but not exclusively for the display of information on a computer screen or other display environment.

BACKGROUND OF THE INVENTION

In a computer environment, for example during an Internet connection, the display of unwanted pop-ups and panels are commonplace. This can be very frustrating and cause nuisance to a user. As a workaround, pop-up blockers exist which relate to specific applications such as browsers. This generally prevents all pop-ups from appearing, but pop-up blockers only function within those specific applications. Thus, presently available pop-up blockers do not relate to the desktop or overall display environments being used by the user, and do not provide an intelligent manner by which the greater management of pop-ups and windows on a display can be handled.

Existing technologies used to control the desktop also fail to enable complete control of window arrangement and display. For example, US 2006/0161623A1 discloses a method and apparatus for sharing information on a desktop with another device, where the desktop includes a hidden window which cannot be viewed on the other device. Additionally, US 2006/0107229A1 discloses a method and apparatus for using a three-dimensional transformation which effectively decouples an operating system from the application it hosts, in order to minimize visual clutter on the desktop.

None of the available prior art techniques appear to address the objective problem of fully controlling the location and display of windows within a graphical user interface. It is an object of the present invention to alleviate some of the problems associated with these prior art techniques. It is a further object of the present invention to provide a method and system to effectively handle and control the display of pop-up information in new windows on the desktop or other display environments.

BRIEF SUMMARY OF THE INVENTION

One aspect of the present invention provides a method for arranging windows within a display to enable a user to operate in an uninterrupted fashion within a delimited working area. In one embodiment, this method comprises the steps of: defining a delimited area on the display for a predetermined activity; identifying a new application which when active comprises an active location on the display that would cover some or all of the delimited area; and processing the new application to automatically change the active location thereof on the display such that the active location would not cover some or all of the delimited area.

Another aspect of the present invention provides a corresponding system for arranging windows on a display to similarly utilize a delimited working area. This system comprises: a module for defining a delimited area on the display to carry out a predetermined activity; a module for identifying a new application, which when active, comprises an active location on the display that would cover some or all of the delimited area; a processor for processing the new application to automatically change the active location thereof on the display such that the active location would not cover some or all of the delimited area.

Further aspects of the invention can be seen in the appended dependent claims.

BRIEF DESCRIPTION OF THE DRAWINGS

Reference will now be made by way of example to the accompanying drawings, in which.

DETAILED DESCRIPTION OF THE INVENTION

Figure 1:
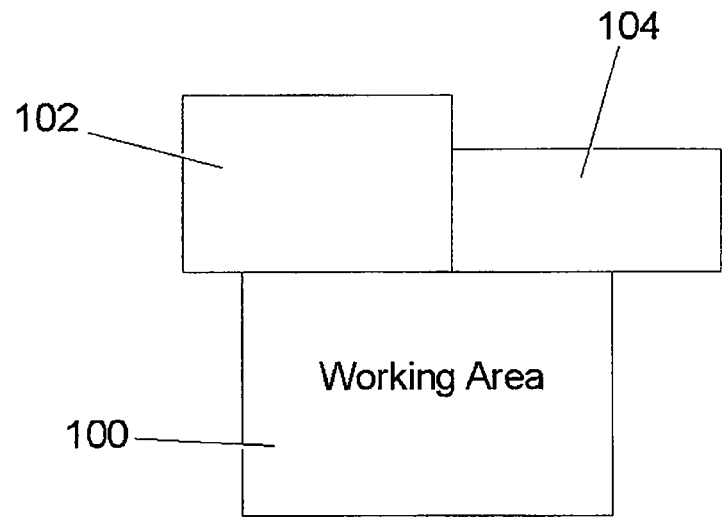
FIG. 1 depicts a block diagram of a display at a first time, in accordance with one embodiment of the present invention.

Referring initially to FIG. 1, a delimited working area 100 is shown within a display. In addition, further active applications 102 and 104 may also be actively displayed within the display. The delimited working area 100 is a specific area of the display which is defined by a user or in any other appropriate manner and is intended to be an area which is protected in a certain manner. The nature of the protection of the delimited working area 100 will depend on the particular application of the invention. For example, the delimited working area may be protected such that a pop-up or new window cannot be launched or displayed in this area. Similarly, the delimited working area may be configured to be protected from other events, for example, from the classic CTRL+F command which typically opens a search panel just over the window of the application currently in use, or from the events of a running minimized application which produces a popup error. The delimited working area therefore is the area which is dedicated to specific activities that may be worked on at the present time. There is no limit to the specific activities that may be carried out in this delimited working area.

Figure 2:
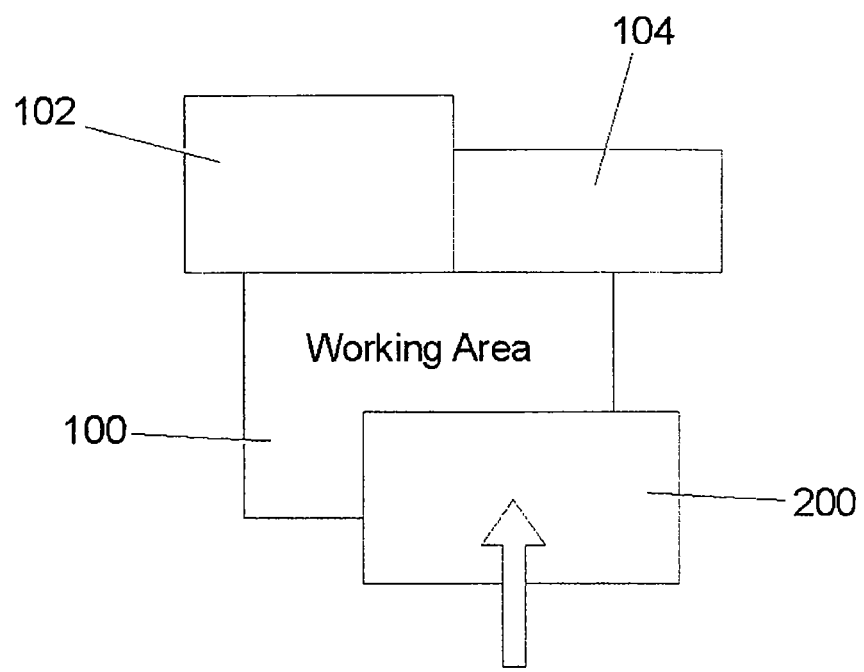
FIG. 2 depicts a block diagram of the display at a second time, in accordance with one embodiment of the present invention.
Figure 3:
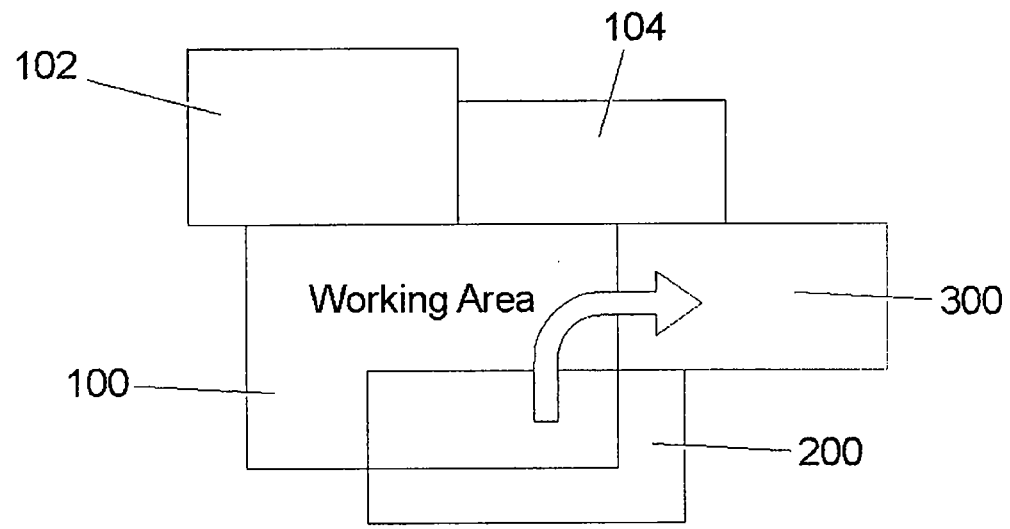
FIG. 3 depicts a block diagram of the display at a third time, in accordance with one embodiment of the present invention.
Figure 4:
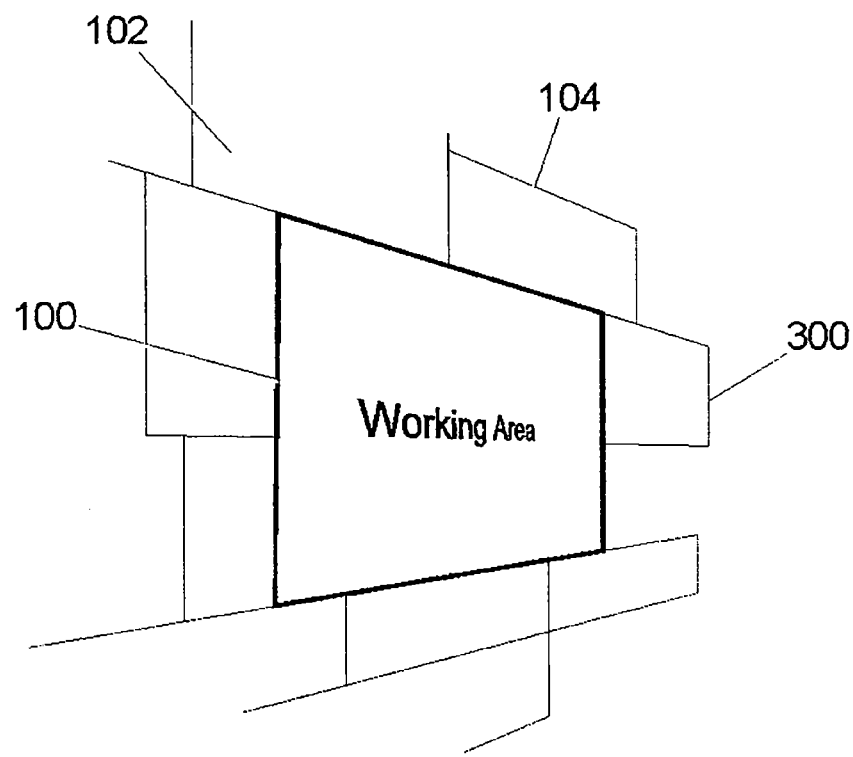
FIG. 4 depicts a block diagram of the display in three dimensions, in accordance with one embodiment of the present invention.

Referring to FIG. 2, a new window 200 may be launched, which covers some or all of the delimited working area 100. The new window may be a panel, pop-up, form, or any other appropriate application or GUI. As the new window 200 has opened into some of the delimited working area, this embodiment of the present invention operates by moving this application automatically away from the delimited working area 100. This can also be seen in FIG. 3 where new window 200 has been moved to position 300. Similarly, in a three-dimensional desktop as illustrated in FIG. 4, the arrangement of the working area and other applications will be three-dimensional also. The delimited working area 100 will be at the front while other operative applications (for example, 102 and 104) will be placed behind. The new position of new window 200 is shown as 300 as in FIG. 4.

Figure 5:
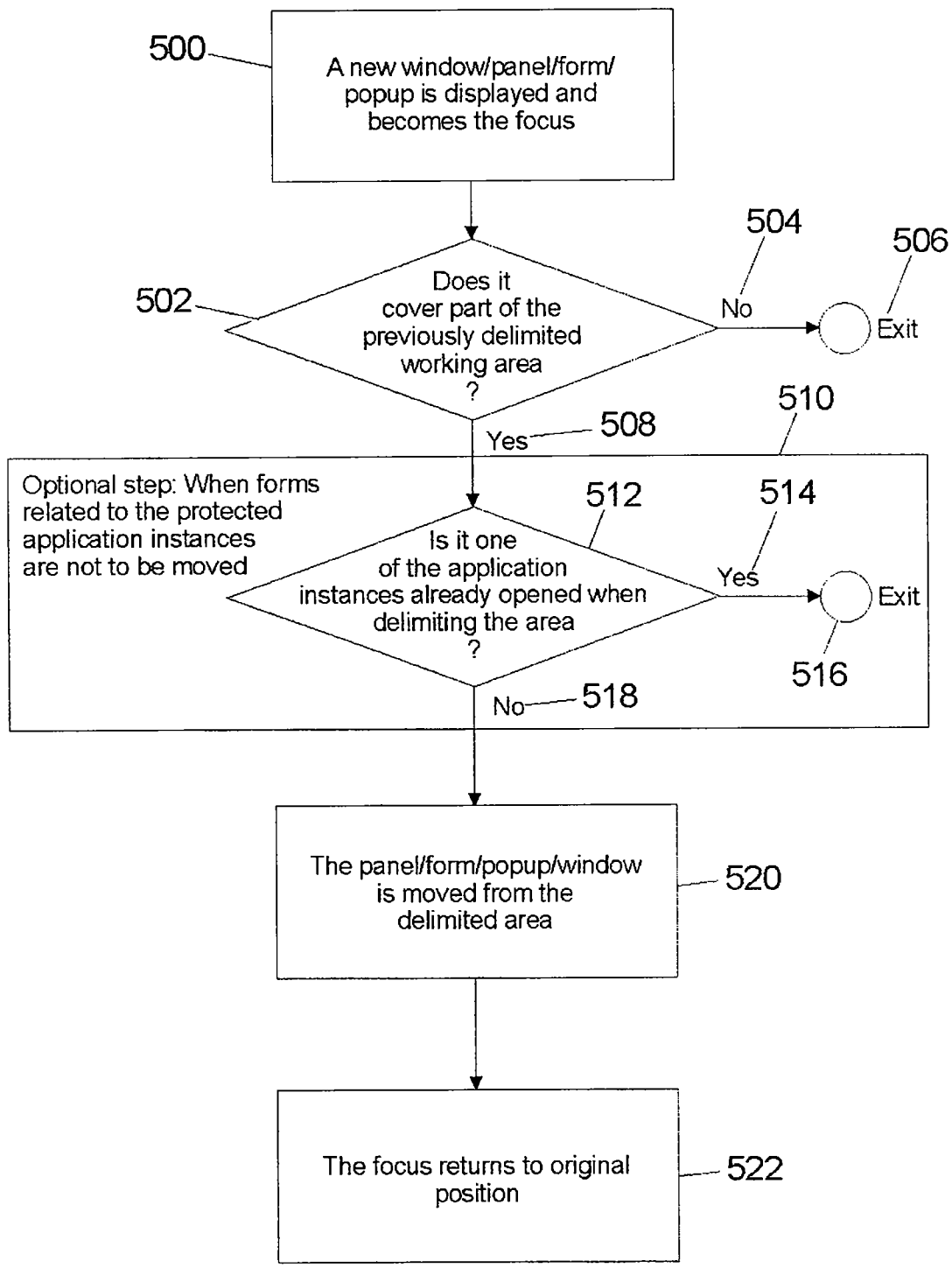
FIG. 5 depicts a flowchart of an operation for controlling the arrangement of windows on a display in accordance with one embodiment of the present invention.

Referring to FIG. 5, a flowchart of the method steps of one embodiment of the present invention will now be described. At step 500, a new window (panel, form, or pop-up) is displayed and becomes the focus of activity on the display screen. A determination is made at step 502 as to whether or not the new window covers part of a previously delimited working area. If the answer is no (as in step 504) the process stops (as in step 506). If the answer is yes (as in step 508) the process proceeds to step 510. Step 510 includes step 512 at which a determination is made as to whether the new window relates to an application instance that was already opened when the working area was delimited. This is important as it provides the ability to determine whether the new window is an application that is not required by the user.

If the answer to the question in step 512 is yes (as in step 514) the process stops (as in step 516). This indicates that the application that has opened at step 500 is one that is already in the display but not the current active window. If the answer to the question in step 512 is no (as in step 518) the process continues to step 520. This means that the application that was opened at step 500 is not an application that was already opened when the delimited working area was set up and as such would be a nuisance to the user if it opened in the delimited working area. As a result, at step 520 the new window is processed and moved from the delimited working area to a different area on the screen, for example to a new active location. The focus and any action that is being carried out at the time then returns to the original position in the delimited working area at step 522. In other words, for example, the cursor returns to the place where it was last located before the process was carried out.

Step 510 described above, is an optional step and may be skipped according to user selection. Thus, forms and windows related to the protected application instances may be configured to be moved only if desired.

Figure 6:
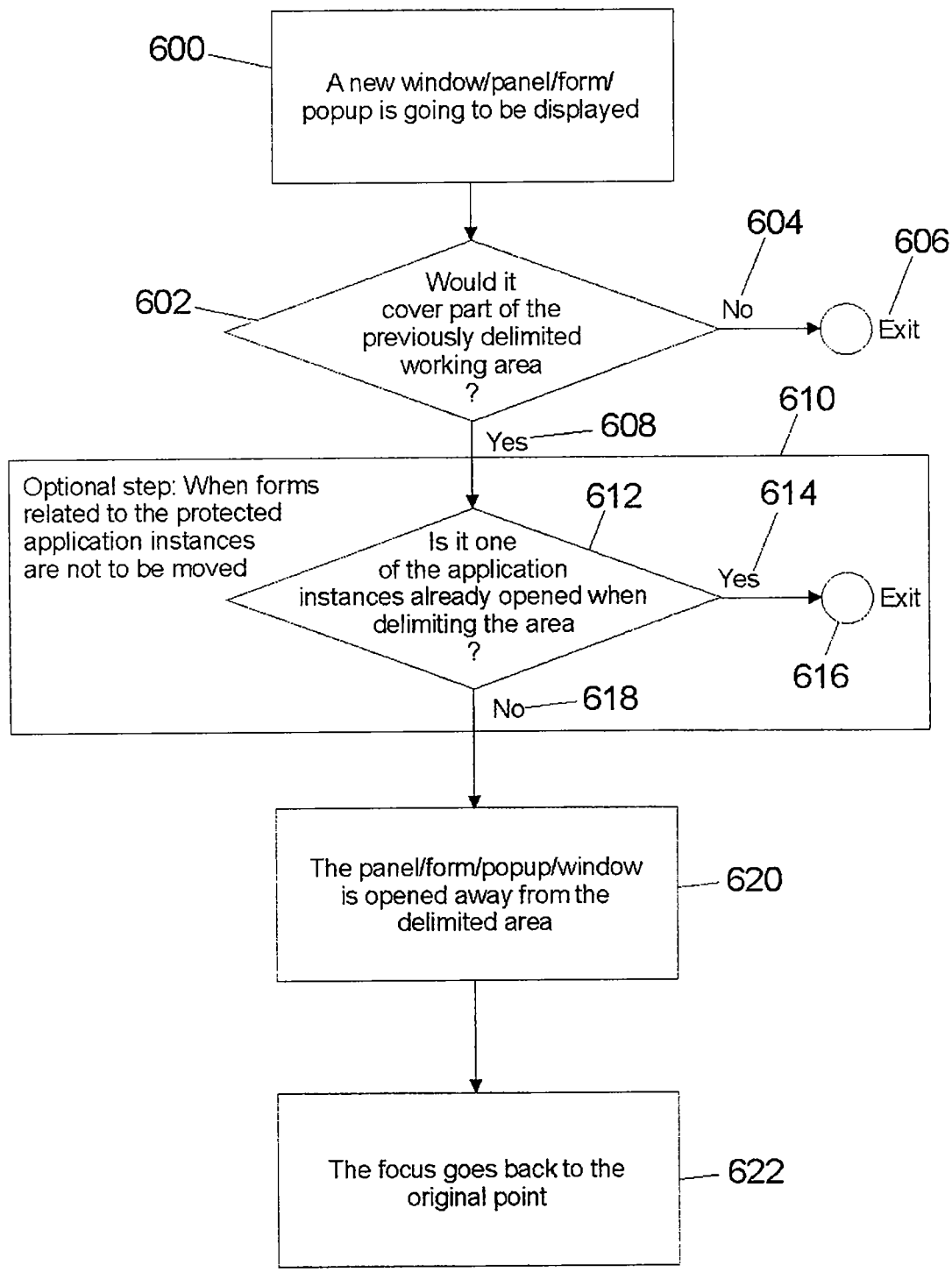
FIG. 6 depicts a flowchart of an operation for controlling the arrangement of windows on a display in accordance with a further embodiment of the present invention.

In FIG. 5 the steps take place as a new window appears on the display or screen. FIG. 6, on the other hand, is carried out at an earlier point. FIG. 6 relates to the method steps of when a new window is going to be displayed on the screen while a delimited working area exists. At step 600, identification is made that a new window is going to be displayed. At Step 602 a determination is made as to whether or not the new window would cover part of the previously delimited working area where it is to open. If no (as in step 604) the process exits (as in step 606). If yes (as in step 608) step 610 proceeds if the user has optionally determined that any new windows should not enter the delimited working area. Step 610 includes steps 612 where a determination is made as to whether or not the new window that is going to open is an application that was already running when the delimited working area was defined. If the application was already running (yes as in step 614) the process exits in step 616. If the new window was not already running (no as in step 618) step 620 proceeds. In step 620 the new window processed and is opened in an area that is away from the delimited working area, such as the new active location. The active focus point of the user then returns to the original focal point at step 622.

The invention has been described with reference to the display or screen that is generally associated with a computer or other processing device (for example, a PDA). It will be appreciated by one skilled in the art, however, that numerous other platforms for application of the present invention may exist.

The steps 502 and 602 of determining whether the new window covers part of the previously delimited working area may be carried out in many different ways. For example, the delimited working area may be scanned or analyzed to detect the location in which the new window opens or will open. In addition, aspects of the setup of the new window can be calculated to determine the size of the new window and therefore to determine whether the new window will partially or completely cover the delimited working area. For example, by using image recognition algorithms, a determination of the percentage of overlap between the new window and the delimited working area can be identified, such that the new window is moved when the percentage overlap exceeds a predetermined limit. This limit may be set by the user or in any other appropriate way.

The present invention therefore provides a number of advantages. By invoking the optional step of requiring any new window to be moved from the delimited working area, the user will be able to work an uninterrupted and unhindered manner. By predicting where a new window is going to open and whether or not it relates to an application that was already running when the working area was delimited, the user can see pop-ups or other new windows which may be of interest, without being specifically disturbed by the presence of the new window. In addition, in this way the manner in which information is presented on a display is more effectively managed.

It will be appreciated that examples other than those described above may exist, which fall within the scope of the present invention. For example, the steps may take place in different order. Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method comprising:

defining a delimited display area within a computing system display, the delimited display area defined to encompass a first location on the computing system display associated with a first application instance that is currently running, a second application instance also currently running at a time when the delimited display area is defined, the second application instance different than and unrelated to the first application instance;

after defining the delimited display area, determining that a third application instance that is running has displayed a second location on the computing system display that overlaps the delimited display area, the third application instance unrelated to the first application instance;

in response to determining that the third application instance has displayed the second location that overlaps the delimited display area, determining whether the third application instance is the second application instance that was running at the time when the delimited display area was defined and is of a same computer program as the second application instance or is of a different computer program than the second application instance;

in response to determining that the third application instance is of the same computer as the second application instance, where the second location is a new window associated with the third application instance that was not being displayed when the delimited display area was defined, and where the second location is not associated with the second application instance, permitting the second location to overlap the delimited display area even though the third application instance is different than and unrelated to the first application instance with which the first location is associated and that the defined display area has been defined to encompass; and in response to determining that the third application instance is of the different computer program than the second application instance, regardless of whether the second location was being displayed when the delimited display area was defined, moving the second location displayed by the third application instance so that the second location does not cover any of the delimited display area.

2. The method of claim 1, wherein the computing system display has an original focus associated with the second location displayed by the second application instance prior to moving the second location, and wherein the method further comprises:

after moving the second location, reverting a focus of the computing system display to the original focus associated with the second location displayed by the second application instance prior to moving the second location, instead of maintaining the focus at a new focus of the computing system display associated with the second location displayed by the second application instance after moving the second location.

3. The method of claim 2, wherein the original focus comprises an original position of a pointer displayed on the computing system display, the focus comprises a position of the pointer displayed on the computing system display, and the new focus comprises a new position of the pointer displayed on the computing system display.

4. The method of claim 1, wherein determining that the third application instance that is running has displayed the second location on the computing system display that overlaps the delimited display area comprises applying an image recognition algorithm.

5. The method of claim 1, wherein defining the delimited display area comprises receiving user specification as to the delimited display area.

6. The method of claim 1, wherein the location is one of a window, panel, form, and popup.

* * * * *